(12) United States Patent
Ouchi et al.

(10) Patent No.: US 7,196,809 B2
(45) Date of Patent: Mar. 27, 2007

(54) PRINTING SYSTEM USING PRINTING PLAN

(75) Inventors: Maki Ouchi, Kanagawa (JP); Takayuki Iida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 845 days.

(21) Appl. No.: 10/207,032

(22) Filed: Jul. 30, 2002

(65) Prior Publication Data

US 2003/0025936 A1 Feb. 6, 2003

(30) Foreign Application Priority Data

Jul. 30, 2001 (JP) ............................ 2001-229246
Jun. 24, 2002 (JP) ............................ 2002-183280

(51) Int. Cl.
*G06F 3/12* (2006.01)
*G06K 1/00* (2006.01)

(52) U.S. Cl. ........................................ 358/1.15; 399/24

(58) Field of Classification Search ............... 358/1.15, 358/1.13; 710/15; 355/40; 348/207.2; 399/23, 399/24, 79; 709/203
See application file for complete search history.

(56) References Cited

U.S. PATENT DOCUMENTS

| | | | | |
|---|---|---|---|---|
| 5,611,046 A | * | 3/1997 | Russell et al. ............... | 358/1.16 |
| 5,875,383 A | * | 2/1999 | Stemmle ..................... | 399/384 |
| 6,275,664 B1 | * | 8/2001 | Wolf et al. ..................... | 399/8 |
| 6,295,117 B2 | * | 9/2001 | Haraguchi et al. ............ | 355/40 |
| 6,515,732 B1 | * | 2/2003 | Fant et al. ..................... | 355/40 |
| 2001/0017711 A1 | * | 8/2001 | Ishida ........................ | 358/1.15 |

FOREIGN PATENT DOCUMENTS

| | | |
|---|---|---|
| JP | 11-305341 | 5/1999 |
| JP | 2000-158766 | 6/2000 |

* cited by examiner

*Primary Examiner*—Kimberly Williams
*Assistant Examiner*—Dillon Murphy
(74) *Attorney, Agent, or Firm*—Sughrue Mion, PLLC

(57) ABSTRACT

There is provided a printing system which allows efficient printing at a low cost. In a printing system, unprocessed order information is arranged so as to be sequentially processed from order information which can be processed by a printer without changing paper during an unattended operation, and order information which can be processed by paper set in the printer is preferentially printed. As a result, unprocessed image information is processed in an unmanned state at the maximum. Further, before switched to an unattended operation, a paper size in which the greatest number of prints are to be prepared is selected and the selected result is notified to an operator to instruct him or her to set the paper indicated by the result in the printer, thereby allowing order information to be processed by an unattended operation at the maximum.

18 Claims, 12 Drawing Sheets

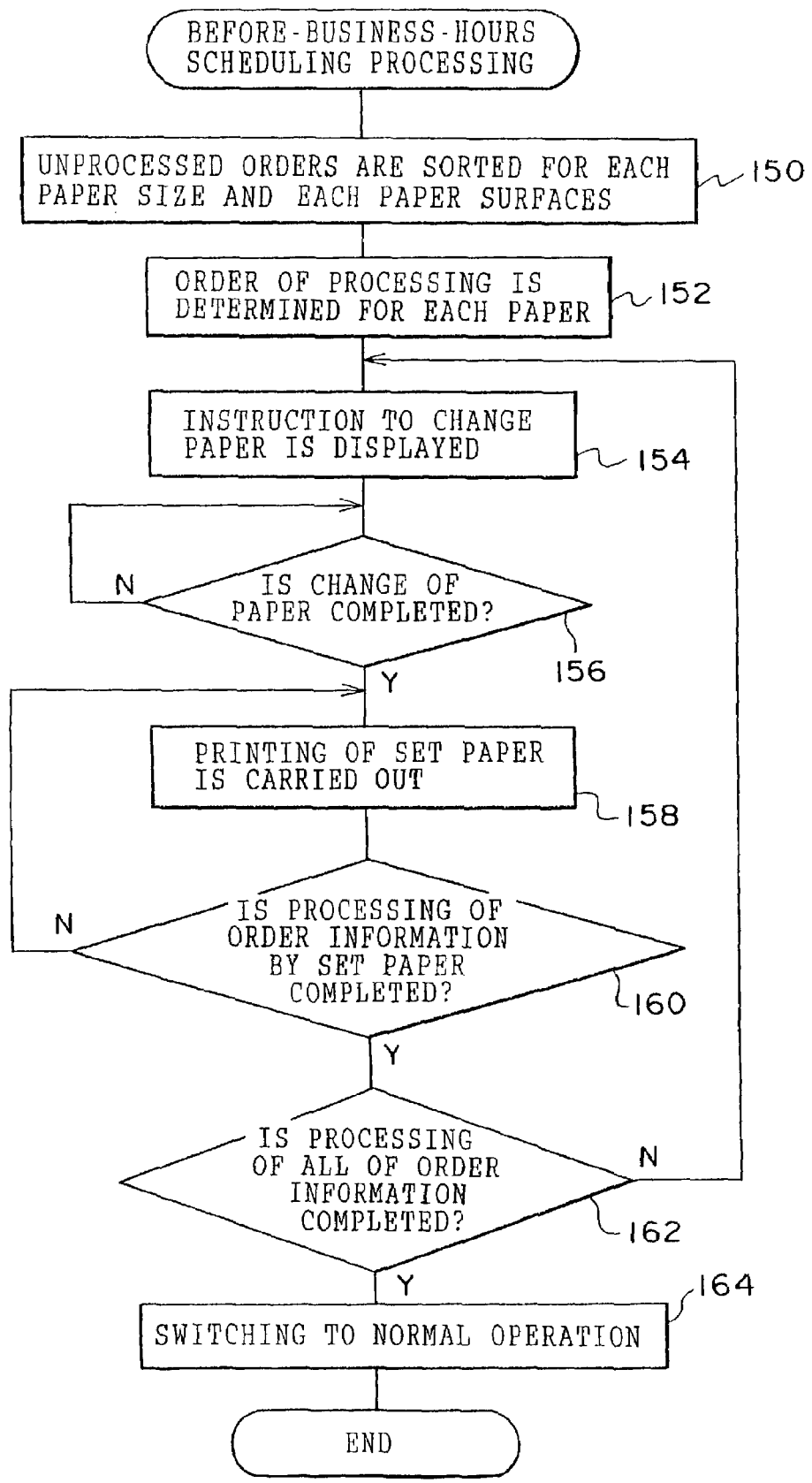

FIG. 7A
PROCESSED AMOUNT PREDICTED BY AN ARGORITHM

| CUSTOMER | PAPER SIZE | QUANTITY | SPECIAL PROCESSING | PAPER SURFACES |
|---|---|---|---|---|
| A | 89X127 | 36 | NORMAL | G |
| B | 89X127 | 24 | NORMAL | G |
|  | 89X254 | 1 | NORMAL | G |
|  | 127X178 | 2 | NORMAL | G |
| C | 89X119 | 50 | NORMAL | G |
| D | 127X216 | 10 | NORMAL | G |
| E | 254X305 | 1 | CALENDAR | G |
|  | 152X216 | 1 | NORMAL | G |
| F | 89X127 | 12 | NORMAL | G |
|  | 254X381 | 1 | NORMAL | G |
| G | 152X102 | 1 | NORMAL | G |

FIG. 7B ⇩
RESULT OF DETERMINATION FOR SET PAPER BY SCHEDULING SOFTWARE

| PAPER SIZE | PAPER SURFACES | NUMBER OF ROLLS |
|---|---|---|
| 89mmX180m ROLL | G | 1 |
| 127mmX90m ROLL | G | 1 |

FIG. 7C ⇩
PROCESSING PROCEDURE IN UNATTENDED OPERATION BY SCHEDULING SOFTWARE

| CUSTOMER | PAPER SIZE | QUANTITY | PROCESSING PROCEDURE |
|---|---|---|---|
| A | 89X127 | 36 | |
| B | 89X127 | 24 | |
|  | 89X254 | 1 | |
|  | 127X178 | 2 | |
| C | 89X119 | 50 | |
| D | 127X216 | 10 | |
| F | 89X127 | 12 | |

FIG. 7D ⇩
RESULT OF INSTRUCTION TO CHANGE PAPER AFFTER OPERATION START TIME OF OPERATOR BY SCHEDULING SOFTWARE

| PAPER SIZE | PAPER SURFACES | NUMBER OF ROLLS |
|---|---|---|
| 152mmX180m ROLL | G | 1 |
| 254mmX90m ROLL | G | 1 |

FIG. 7E ⇩
PROCESSING PROCEDURE BY SCHEDULING SOFTWARE

| CUSTOMER | PAPER SIZE | QUANTITY | PROCESSING PROCEDURE |
|---|---|---|---|
| E | 254X305 | 1 | |
| F | 254X381 | 1 | |
| E | 152X216 | 1 | |
| G | 152X102 | 1 | |

FIG. 7F ⇩
PRINTS ARE ARRANGED BY OPERATOR FOR EACH CUSTOMER

FIG. 10

```
PARTITION SHEET    CUSTOMER NO. 0010

DCFS0076.jpg    NO BORDER    L SIZE     ONE SHEET
    ⋮              ⋮           ⋮           ⋮

DCFS0100.jpg    NO BORDER    QUARTER    UNPROCESSED    ← A
                                        RECEIVED
    ⋮              ⋮           ⋮           ⋮

DATE OF DELIVERY:
THREE DAYS AFTER
```

PRINTING SYSTEM USING PRINTING PLAN

BACKGROUND OF THE INVENTION

1. Field of the Invention

The present invention relates to a printing system, and particularly to a printing system in which, based on order information, an image is printed on a recording medium and outputted.

2. Description of the Related Art

Conventionally, mini-laboratories (hereinafter referred to merely as "laboratories"), in which development of films photographed by a camera for a silver halide film is carried out, have been scattered in various regions. Each laboratory provides a printing service in which development of films and printing of photographs in response to a customer's order are combined. Further, a service of printing, in response to a customer's order, image data acquired by optically reading a developed film or a prepared photographic print using a scanner, or image data photographed by a digital camera or the like and electronically recorded is also provided.

Moreover, a printing service via a network has been also provided recently with the popularization of the Internet. Specifically, various types of services such as an order of prints of a photographic image, attachment of a photographic image to an electronic mail message, and download of a photographic image (image data) are provided by installing equipment, for example, a film scanner, a printer, and a computer including a large capacity disc system in a laboratory in order to allow a general user (a customer) to access the computer installed for a reception of an order via a network.

In the printing service via a network as described above, orders from customers can be received at all hours (for 24 hours). A laboratory is demanded to improve the operation rate of a printer to allow efficient printing, for example, the printing system is operated in an unmanned state in the night (unattended operation), and on the following day of the receipt of an order, printing is completed and a prepared print is delivered to a customer. However, the number of (types of) recording paper (roll) which can be loaded in the printer is limited (in an existing printer, a maximum of two (types of) recording rolls are set), and an operator is required to reset recording paper in the printer in response to an order. Therefore, at the time when information of an order, in which a type of recording paper different from that loaded in the printer is specified, needs to be processed, the unattended operation should have been interrupted.

Accordingly, Japanese Patent Application Laid-Open (JP-A) No. 11-305341 discloses a technique in which information of an order received, and image information of the order are stored in a printing device, and the information stored, during off hours of an operator or in the night, is read and printed, thereby allowing an unattended printing operation. A recording medium having a widthwise dimension which allows printing of maximum size is set in the printing device during an unattended operation.

Further, JP-A No. 2000-158766 discloses a technique in which two or more sets of an order counter and a printing device are installed, and when a printing device in the first set is inoperative, data is transferred to an order counter in the second set and a printing device in the second set is made to carry out printing.

However, JP-A No. 11-305341 has a problem in that, in order that a recording medium printed during an unattended operation may be cut into a proper size, the printing device is required to have the function of cutting the recording medium in transverse and longitudinal directions, thereby resulting in increase of manufacturing cost. When a conventional one-way cutting function is used for the purpose of preventing increase of cost, a cutting operation by an operator is required and is inefficient.

Further, in the technique disclosed in JP-A No. 2000-158766, a printing device for printing pictures is very expensive, and therefore, it is difficult to realize installation of two or more sets of order counter and printing device in each laboratory because of costs. Moreover, it is also considered that order counters and printing devices installed in respective laboratories are connected via a network, and a set of counter and printing device, which is installed in one laboratory, is used as the first set and a set of counter and printing device, which is installed in another laboratory, is used as the second set. In this case, however, it is necessary to collect prints made in the other laboratory, to which data is transferred. In this case as well, a problem arises in which the operation becomes inefficient.

SUMMARY OF THE INVENTION

The present invention has been achieved so as to solve the aforementioned problems, and an object thereof is to provide a printing system in which efficient printing is carried out at a low cost.

In order to achieve the aforementioned object, one aspect of the present invention is a printing system comprising: a reception section for receiving order information which indicates an order of printing processing in which an image is printed on a recording medium; and a control section which controls so as to select a predetermined printing algorithm corresponding to the received order information, set a printing plan of the order information for printing the image on a recording medium set as the recording medium to be printed, and print the image by the set printing plan.

In accordance with a second aspect of the present invention, in the first aspect, the control section predicts the order information to be received by the reception section, and based on a predicted result of the order information to be received and the order information already received, predicts the recording medium by which the maximum number of the order information can be processed during control by the control section, and sets the printing plan for printing the image on the predicted recording medium.

In accordance with a third aspect of the present invention, in the second aspect, the control section predicts, based on history information of the order information received in the past, the order information to be received.

In accordance with a fourth aspect of the present invention, in the first aspect, a state notifying section which notifies a state controlled by the control section is further provided.

In accordance with a fifth aspect of the present invention, in the first aspect, a prediction/notifying section, which predicts and notifies an amount of order information which cannot be processed due to control by the control section, is further provided.

In accordance with a sixth aspect of the present invention, in the first aspect, the reception section includes an input section for directly inputting the order information.

In accordance with a seventh aspect of the present invention, in the first aspect, the reception section includes a receiving device which is connected to a network and receives order data transmitted from a device connected to the network to receive the received order data as the order information.

In accordance with an eighth aspect of the present invention, in the first aspect, the recording medium can be supplied selectively from a main supplying section mounted within the printing system and a sub-supplying section provided so as to be capable of changing the recording medium supplied from outside of the printing system, and the control section sets a printing plan for each of the recording medium supplied from the main supplying section and the recording medium supplied from the sub-supplying section.

In accordance with a ninth aspect of the present invention, in the eighth aspect, the main supplying section supplies an elongated recording medium which is used by being cut at the time of printing, and the sub-supplying section supplies a recording medium previously cut into a predetermined size.

According to the aforementioned aspect of the present invention, the reception section receives order information which indicates an order of printing processing for printing an image on a recording medium such as recording paper. The reception section may include an input section for directly inputting order information and the order information may be directly inputted by operating the input section as described in the sixth aspect. Alternatively, the reception section may include a receiving device connected to a network and receiving order data transmitted from a device connected to the network to receive the received order data as order information as described in the seventh aspect. Thus, the receiving device may receive order information via the network.

The control section controls so as to select a printing algorithm corresponding to the received order information (for example, an algorithm in which an image is printed in accordance with a print size specified by order information, namely, an image is fitted in a predetermined template), and set a printing plan of order information for printing an image on a recording medium which is set as the recording medium to be printed, and also print an image by the set printing plan.

Based on control by the control section using the printing plan, order information, in which processing (printing) is carried out for a recording medium set as the recording medium to be printed, can be preferentially processed irrespective of acceptance order of order information accepted by the reception section. As a result, so long as the determined recording medium is set in the printing system, order information which can be processed (printed) on the set recording medium can be preferentially processed. In other words, the number of prints prepared using the determined recording medium can be made maximum, and a large number of prints can be prepared in an unmanned state, namely, without requiring an operator's hand, such as replacement of a recording medium, compared with a conventional system. Further, the order of processing order information received may be arranged only using software and can be realized at a low cost.

According to the second aspect of the present invention, in the control section, order information which will be received by the reception section in the night or on a holiday is predicted, and based on the predicted result of order information and order information already received, a recording medium by which the largest number of order information can be printed is predicted during control by the control section, and a printing plan for printing an image on the predicted recording medium is set.

That is, a recording medium for which the largest number of prints based on the printing plan is prepared is predicted, and a printing plan for the predicted recording medium is set as described in the third aspect. As a result, the number of prints prepared in an unattended operation can be made maximum.

In this case, predictive accuracy becomes controversial. For example, so long as the order information which will be received is predicted based on history information of order information received in the past, predictive accuracy can be further improved as the history information is more stored.

Further, so long as a state notifying section which notifies a state controlled by the control section is further provided as described in the fourth aspect, when printing cannot be carried out based on control of the control section due to occurrence of any error, or when order information cannot be processed (printed) as scheduled, such state can be notified to an operator.

Moreover, so long as a prediction/notifying section which predicts and notifies an amount of order information which cannot be processed (printed) based on control of the control section is further provided as described in the fifth aspect, for example, the state in which there are many order information which cannot be processed (printed) based on control of the control section, such as order information requiring an operator's hand, can be notified to an operator.

Generally, a printing system has a structure in which a supplying section for supplying a recording medium, such as a magazine in which a recording medium is accommodated, is loaded within the system, and the type of recording medium is changed by changing the magazine to be loaded. As a result, a considerable burden is imposed on an operator.

In accordance with the eighth aspect, in addition to the main supplying section used and loaded within the system, such as the magazine, the sub-supplying section is also capable of supplying a recording medium. The sub-supplying section can change a recording medium supplied from outside to allow simple replacement of a recording medium. Accordingly, so long as the main supplying section and the sub-supplying section are selectively used in such a manner that recording medium accommodated in the main supplying section is used for an order of a large number of prints, and recording medium accommodated in the sub-supplying section is used for an order of a small number of prints, the number of times of changing the main supplying section in which a large operating burden is imposed on an operator can be reduced.

In this case, the main supplying section may be provided so as to supply an elongated recording medium used by being cut at the time of printing, and the sub-supplying section may be provided so as to supply recording medium previously cut into a predetermined size.

BRIEF DESCRIPTION OF THE DRAWINGS

FIG. 6 is a flow chart of before-business-hours scheduling processing, which is executed by a computer of the printing system according to the embodiment of the present invention.

FIGS. 7A–7F are diagrams for illustrating the flow of processing executed in a laboratory after a closing time and before the next opening time, according to the embodiment of the present invention.

FIG. 10 is a diagram showing an example of order form.

DESCRIPTION OF THE PREFERRED EMBODIMENTS

An embodiment of the present invention will be hereinafter described in detail with reference to the attached drawings.

[Structure]

Figure 1:
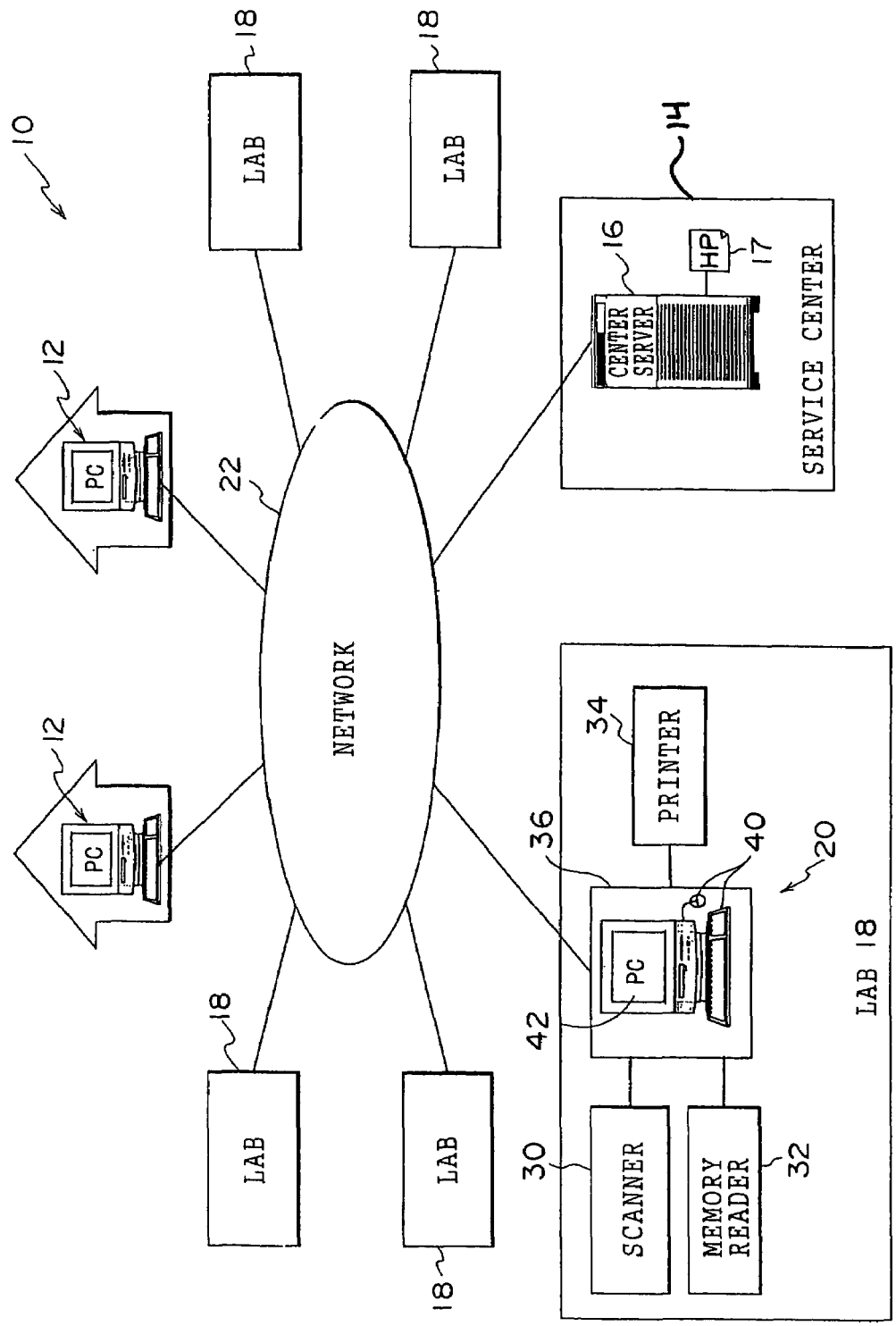
FIG. 1 is a network structure diagram showing a network printing system according to an embodiment of the present invention.

A network printing system 10 shown in FIG. 1 is constructed in such a manner that computers (personal computer) 12 installed at a home or in an office and operated by customers, a center server 16 installed in a service center 14 to receive various orders from customers, and printing systems 20 installed in laboratories 18, which are scattered in various regions, to carry out picture printing are connected with one another via a network 22 such as the Internet. A high speed line is used between the service center 14 and each laboratory 18, in which many communications are established, to allow rapid processing of a greater number of orders.

The center server 16 stores Web data which is browseable via the network 22, and sets up, on the network 22, a so-called Internet web site (home page (HP)) 17 for receiving orders of picture printing. A customer accesses Web data of the center server 16, that is, the home page 17 from the personal computer 12 via the network, and displays information of the home page 17 on a display screen of the personal computer 12. Subsequently, the customer inputs, based on the displayed home page 17, information which specifies a laboratory at which he or she receives a print, and order data which indicates an order of collective printing processing in which printing can be carried out at a time, or an order of special processing which requires separate printing processing, by operating a keyboard or mouse of the personal computer 12. As a result, the customer can transmit order data together with image data to be printed, from the personal computer 12 to the center server 16.

The center server 16 temporarily stores received image data or order data in its internal memory or data base (not shown), and thereafter, transmits image data and order information corresponding thereto to a designated laboratory 18 via the network 22. In each laboratory 18, the printing system 20 installed therein receives image data and order information.

The order information mentioned herein includes personal information such as a customer's name, and information which specifies a print size desired, the type of special processing desired (in a case of special processing being desired), the date on which a customer can receive a prepared print, the way of payment and the like. A typical picture print size is shown in Table 1, and typical special processing is shown in Table 2. In the present embodiment, a print size desired and special processing desired can be specified among from examples shown in the tables.

TABLE 1

| Size | Width (mm) | Feed pitch (mm) |
|------|------------|-----------------|
| LC   | 89         | 127             |
| PA   | 89         | 254             |
| HV   | 89         | 158             |
| Lc   | 127        | 127             |
| L    | 127        | 127             |
| 2Lc  | 127        | 178             |
| 2L   | 127        | 178             |
| 2LWc | 127        | 216             |
| 2LW  | 127        | 216             |
| DSC  | 89         | 119             |
| DSCf | 89         | 127             |
| 891x | 89         | 120             |

TABLE 2

| Type of printing | Details |
|------------------|---------|
| Calendar printing | Printing of a picture to be fitted in a Predetermined calendar template |
| Commemorative character printing in one frame | Printing of a picture with characters at a predetermined position at, for Example, a lower end of the picture |
| Printing of absentee | Printing of an absentee's picture in a group photo of school yearbook or the like |
| Album printing | Printing of pictures of desired size/number to be arranged on a page of school yearbook or the like |
| Card printing | Printing of a picture to be fitted in a predetermined business card template |
| Large index printing | Printing of cut-down version of all pictures on one film to be arranged on one page |
| 2-up/4-up printing | Printing of two/four pictures to be arranged on one page |

In the printing system 20, a scanner 30 which acquires image data by optically reading images from frame images of an exposed and developed film or photographic prints, a memory reader 32 for reading out image data from a memory in which image data obtained by electrically processing an image photographed by a digital camera, or image data acquired by reading frame images or picture prints using a scanner, is electrically or magnetically recorded, and a printer 34 by which an image based on image data is printed on recording paper (hereinafter referred to as paper) such as photosensitive material set therein, are each connected to a computer (personal computer) 36 which manages printing processing of the printer 34. In the present embodiment, a case in which an image is printed on photosensitive material by the printer 34 will be described as an example.

Image data read by the scanner 30 or memory reader 32 is directly inputted to the personal computer 36, and order information corresponding to the image data is directly inputted to the personal computer 36 by operating an input operating means 40 such as a keyboard or mouse provided in the personal computer 36. With a dedicated terminal utilizing a POS system or the like being installed in the laboratory 18 and connected to the personal computer 36, order information may be inputted from the dedicated terminal. Further, image data or order information is inputted from the center server 16 to the personal computer 36 via the network 22.

In the personal computer 36, a printing algorithm corresponding to a print size or special processing specified by the order information directly inputted thereto or inputted via a network is selected, and image data is subjected to image processing in accordance with the selected printing algorithm and outputted to the printer 34, and the printer 34 is instructed to carry out printing specified by the order information.

The printing algorithm mentioned herein means processing for preparing prints of a specified print size or prints based on special processing, such as enlargement or reduction of image data corresponding to a print size, or insertion of image data in a predetermined template in accordance with specified special processing.

Figure 9:
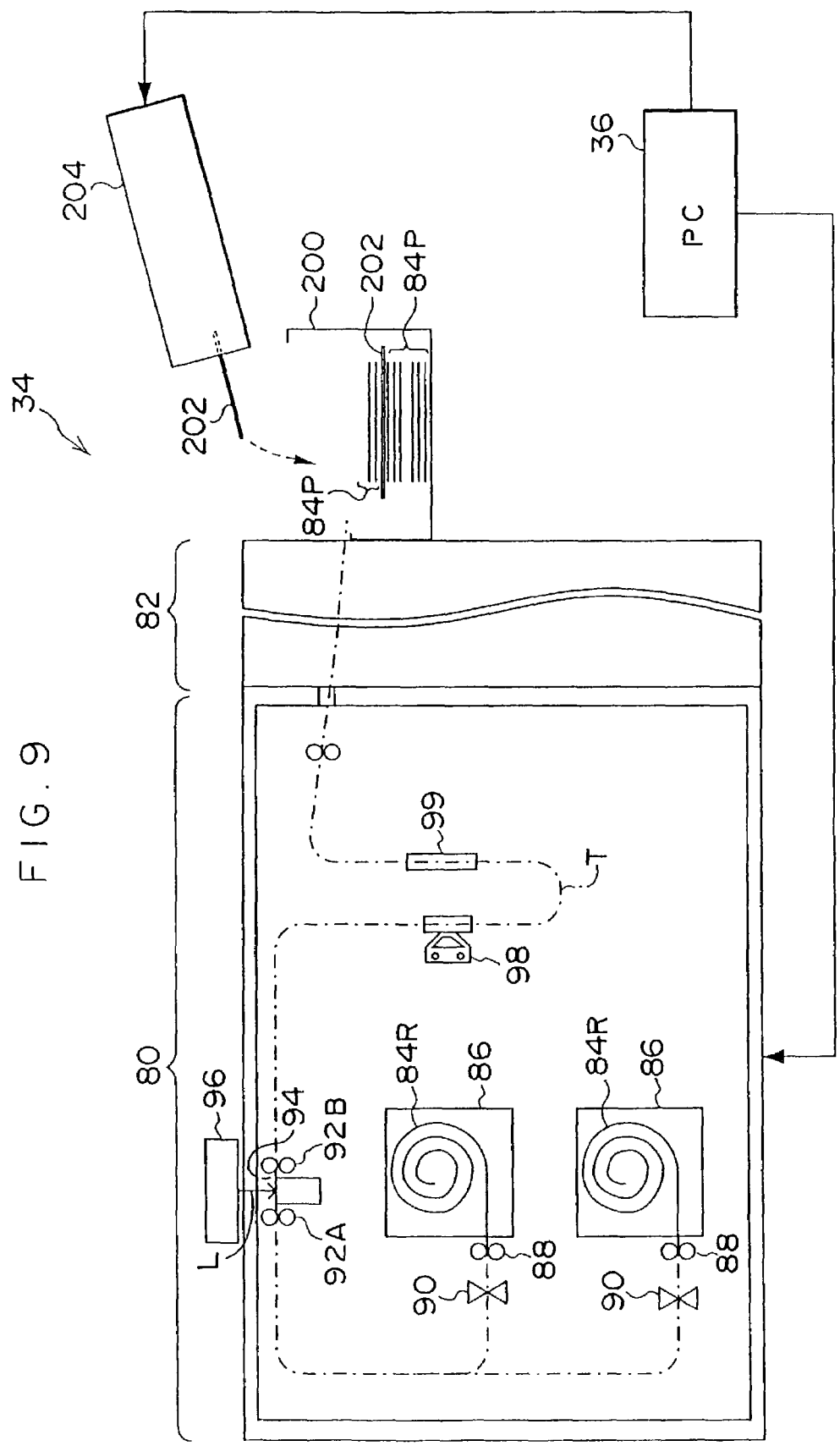
FIG. 9 is a block diagram which schematically shows the structure of a printer according to the embodiment of the present invention.

In the present circumstances, a maximum of two (types of) papers can be set simultaneously in a typical printer for printing pictures. In the present embodiment, a case will be described in which two types of paper can be set simultaneously in the printer 34. Specifically, as shown in FIG. 9, the printer 34 is formed by an exposing device 80 and a developing device 82. Two magazines 86 in each of which elongated paper 84R (so-called roll paper) in the form of a roll is accommodated in a light-shielding box can be mounted in the exposing device 80.

A typical paper size is shown in Table 3. In the printer 34, two types of paper having different transverse dimensions, or two rolls of paper having the same paper size are set, among various paper sizes shown in Table 3.

TABLE 3

| Paper size (width × roll length) |
|---|
| 89 mm × 180 m |
| 127 mm × 90 m |
| 152 mm × 90 m |
| 254 mm × 180 m |

The number of (types of) rolls of paper which can be set in the printer 34 may be one, or may be three or more.

In the printer 34, nip rollers 88 and cutters 90 are disposed in the vicinity of a paper outlet of each magazine 86. The paper 84R is pulled out by the nip roller 88 from the magazine 86 by a predetermined length, and thereafter, can be cut by the cutter 90. The cutter 90 is a rotary cutter comprised of a fixed blade and a moving blade. The moving blade is moved up and down by a rotating cam or the like, and engaged with the fixed blade, thereby making it possible to cut the paper 84R. That is, picture prints of various print sizes shown in Table 1 can be prepared in such a manner that the magazine 86, in which the paper 84R corresponding to a print size to be prepared is accommodated, is mounted in the printer 34, and a feeding length of the paper 84R when cut by the cutter 90 is controlled in the printer 34.

A sheet of paper cut by the cutter 90 is conveyed along a conveying path T indicated by a dashed line in FIG. 9 by a conveying system having a plurality of conveying rollers and a guide plate (not shown) provided between the conveying rollers, and guided first to an exposure section 94 provided between conveying rollers 92A and 92B. A laser light irradiation section 96 is provided above the exposure section 94, and the sheet of paper guided to the exposure section 94 is irradiated with laser light L by the laser light irradiation portion 96 based on image data (image exposure).

The sheet of paper imagewise exposed to light is conveyed by the conveying system, and back printing information is recorded thereon by a back printer 98. With a difference of processing speed between the exposing device 80 and the developing device 82 being adjusted by an adjusting section 99, the sheet of paper is further guided to the developing device 82 (not shown in detail). In the developing device 82, the sheet of paper subjected to exposure processing in the exposing device 80 is subjected to wet processing including development, fix/bleach, washing and the like, and dried. Thereafter, a print (a picture) 84P is discharged, as a finished product, into a tray 200 provided outside.

The printer 34 activates each of portions in accordance with an instruction from the personal computer 36, and selects a roll paper whose transverse dimension corresponds to (coincides with) a print size specified by order information, among paper rolls set in the printer 34. Printing is carried out on the selected paper based on image data, and the paper is cut at the feed length of a specified print size to prepare a print (picture) 84P. When no roll paper having a corresponding transverse dimension is set in the printer 34, an operator changes paper (that is, the magazine 86), and thereafter, printing is carried out on the set paper.

Next, a description will be given of the structure of the personal computer 36. As the personal computer 36, a typical computer including the input operating means 40 such as a keyboard or mouse, and the display 42 can be used, and only portions relating to the present invention will be hereinafter described in detail.

Figure 2:
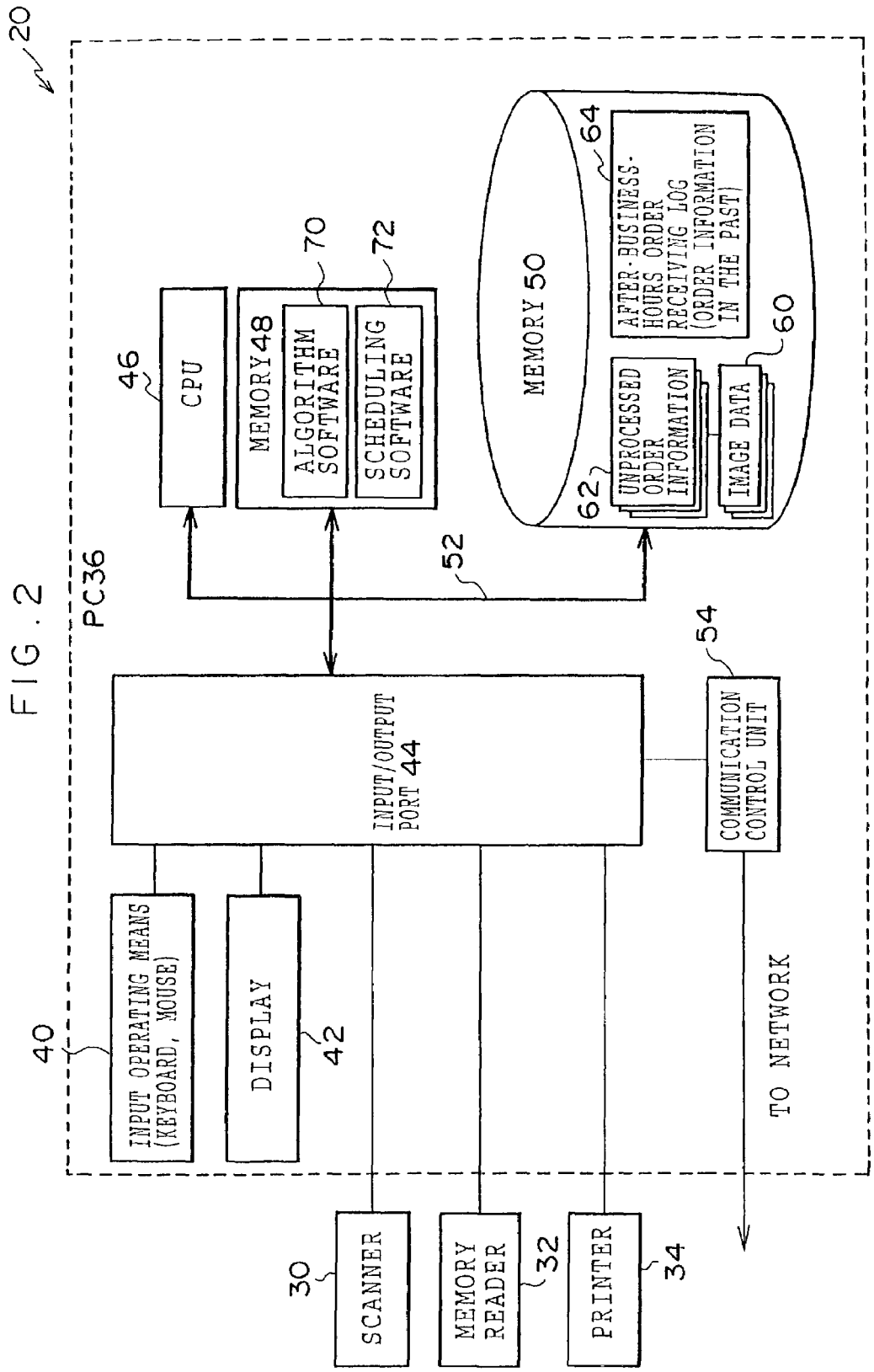
FIG. 2 is a detailed structural diagram of the printing system according to the embodiment of the present invention.

As shown in FIG. 2, in the personal computer 36, an input/output port 44, a CPU 46, a memory 48 such as RAM or ROM in which various software programs including operating systems are stored (installed), and a large capacity memory 50 such as a hard disc drive (HDD) in which image data and order information are stored, are connected with one another via a bus 52.

The aforementioned network 22 is connected to the input/output port 44 via a communication control unit 54 serving as a receiving means. The personal computer 36 transmits and receives information to and from the network 22 by the communication control unit 54. Further, the scanner 30, the memory reader 32, the printer 34 and the communication control unit 54 are each connected to the input/output port 44, and information is inputted and outputted via the input/output port 44 between these devices and each of CPU 46, memories 48 and 50. Further, the input operating means 40 and the display 42 are also connected to the input/output port 44.

The memory 50 stores therein order information 62 and image data 60 before printing processing (not processed). When printing is carried out in the printer 34 or when the image data 60 and the order information 62 are transmitted, as a job, to the printer 34, the image data 60 and the order information 62 are deleted. Further, order information transmitted from the center server 16 via the network 22 after closing time (business hours) in the laboratory 18 is stored in the memory 50 as an after-closing-time order receiving log (after-business-hours order log) 64 even after printing is carried out therefor. The after-closing-time order receiving log 64 corresponds to hysteresis information of the present invention.

The image data, for which printing has been carried out, may not be immediately deleted, but may be stored for a predetermined period, for example, a period specified by a customer or a period in which an order of extra prints is given with a high probability. In this case, it is natural that the image data should be associated with information for identifying a customer, such as personal information of a customer. Further, the image data may be stored in the personal computer 36 or may be stored in the center server 16 after transmitted from the personal computer 36 to the center server 16.

Furthermore, low-resolution image data (hereinafter referred to as "thumb-nail images") is generated from image data and stored, correspondingly to the image data, in the center server 16 or in the personal computer 36 of the laboratory in which a print is prepared. The thumb-nail images are made accessible on the network. Thereby, the thumb-nail images may be used when receiving an order from a customer. As a result, it is possible for a customer to confirm thumb-nail images of pictures, for which he or she gives an order, from the personal computer 12 via the network 22 and give a subsequent print order of extra prints or the like, or carry out download of image data.

In this case, in the center server 16 or personal computer 36, it is necessary that when a customer accesses thumb-nail images, he or she may be identified based on a password authentication or the like in order to judge whether or not he or she is authorized to access the thumb-nail images. Therefore, the thumb-nail images of pictures of each customer are prevented from being observed by others. Further, in a case in which image data is stored in the personal computer 36 of the laboratory 18 in which a print is prepared, when a laboratory 18 different from one specified at the first order (or the previous order) is specified at the time of the next order, the personal computer 36 of the laboratory 18 specified at the first order (or the previous order) may be merely made to transfer image data to the personal computer 36 of the laboratory 18 specified at the next order.

The memory 48 stores therein an algorithm software program 70 and a scheduling software program 72. The aforementioned various print algorithms for respective print sizes or special processing are included in the scheduling software program 72.

Due to the aforementioned programs being each suitably read out and executed by the CPU 46, together with data management of the memory 50, a printing algorithm is selected based on order information, the type of paper to be set when the printer 34 carries out an unattended operation after the closing time (for example, paper size, paper surfaces (glossy finish, silk finish, matte finish, luster or the like), paper thickness (light-weight paper, plain paper or the like), back print (specified or not), and the like; in the present embodiment, only paper size will be described as an example for convenience of explanation) is determined, and order of processing for order information to be printed is determined. When the order of processing for order information is determined, changing the order of processing for order information processed after the closing time is carried out. Namely, a printing plan for order information to be processed (printed) during an unattended operation and for order information to be processed (printed) by an operator before the opening time, which cannot be processed during the unattended operation, is set. Thus, so-called scheduling processing (effecting printing processing for order information in accordance with the printing plan) is performed In other words, due to the algorithm software program 70 and the scheduling software program 72 being suitably read by the CPU 46 and executed, the personal computer 36 functions as a control means of the present invention.

The aforementioned network printing system 10 is shown as an example. Therefore, the present invention is not limited to the same and it suffices that printing can be executed with an order being received from the personal computer 12 via a network. For example, in the foregoing, orders to the laboratories 18 via a network (that is, network orders) are collectively received in the center server 16, and thereafter, assigned to specified laboratories 18. However, the network order from the personal computer 12 may also be directly received by the printing system 20 of each laboratory 18. Further, when the storage capacity of the memory 50 of the personal computer 36 in the printing system 20 becomes a predetermined value or more, a reception of orders to this laboratory 18 via the network 22 may be stopped.

In the present embodiment, the printing system 20 is formed by the personal computer 36, the printer 34, the scanner 30, and the memory reader 32, which are separately provided. However, the present invention is not limited to this structure. For example, the printer 34 and the personal computer 36 may be integrated in such a manner that the function of the personal computer 36 is built-in within the printer 34, or the function of the scanner 30 or memory reader 32 may be built-in within the printer 34. Further, it is not necessary that the memory 50 is built-in within the personal computer 36, and the memory 50 may be used in a state of being separated from and connected to the personal computer 36. For example, an external HDD or data base server may be used as the memory 50.

Next, the operation of the present embodiment will be described.

[Overall Process Flow in a Laboratory]

Figure 3:
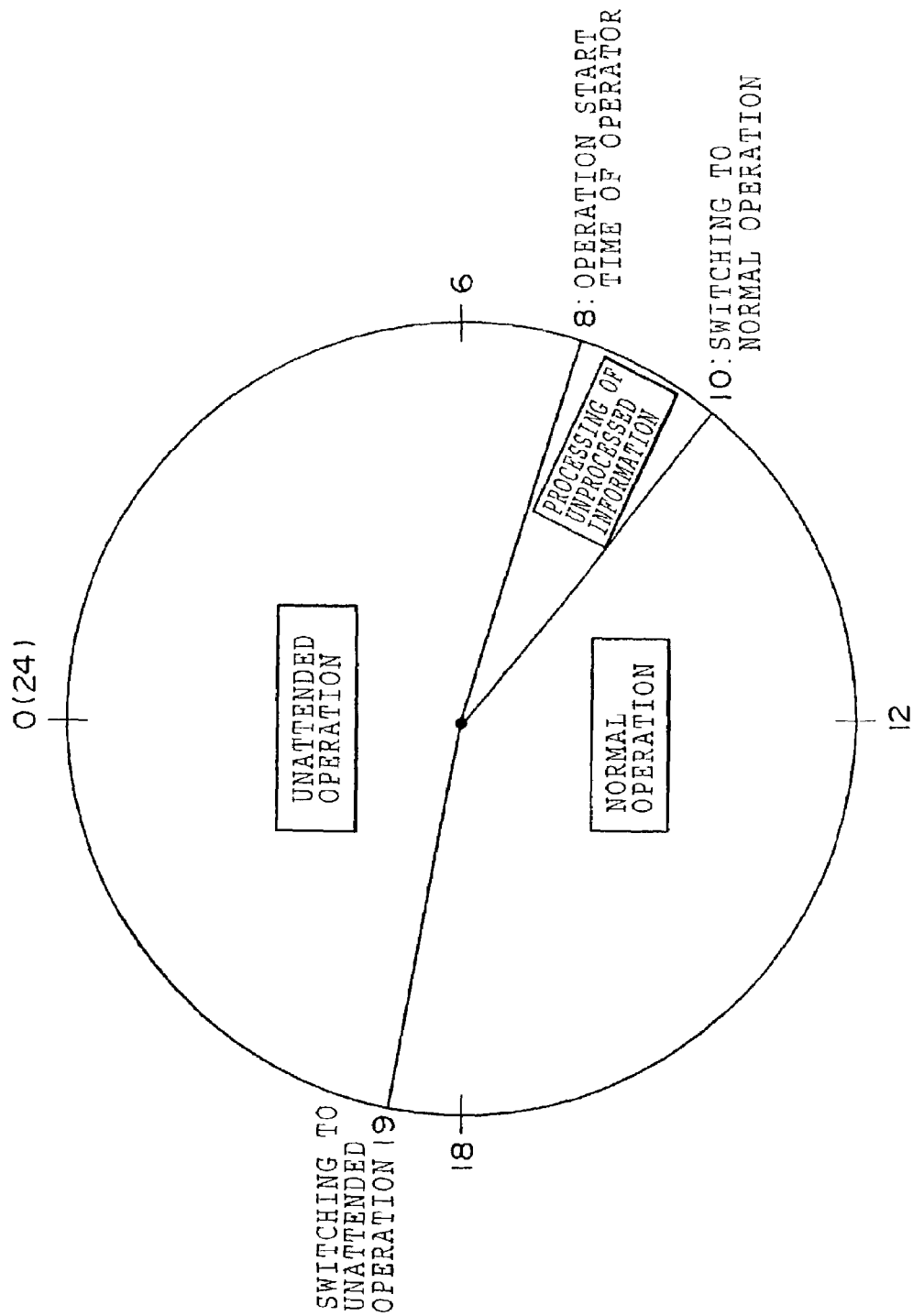
FIG. 3 is a diagram showing an example of a business form of a laboratory according to the embodiment of the present invention.

First, the flow of entire processing in each laboratory 18 will be described. In the following description, a case in which each laboratory 18 opens in the business form shown in FIG. 3 will be given as an example.

Each laboratory 18 opens from ten in the morning to seven in the evening (operating (business) hours) and the printing system 20 is provided so as to carry out normal operation (manned operation) by an operator.

During the operating hours, a film or memory in which image data of photographed pictures is stored are brought in the laboratory 18 by a customer, and an order of picture prints is given. In each laboratory 18, an operator operates the input operating means 40 and inputs order information 62 corresponding to a customer's request into the printing system 20, and further effects reading of image data 60 from the film or memory brought in by the customer using the scanner 30 or memory reader 32 and inputs the same into the printing system 20.

In the printing system 20, the inputted order information 62 and image data 60 are temporarily stored in the memory 50 of the personal computer 36. In the personal computer 36, a printing algorithm specified by the order information 62 is selected, and in accordance with the printing algorithm, information which indicates a printing instruction based on the image data 60 and the order information 62 is generated, and the generated information is sequentially transmitted, as the printing instruction, from the personal computer 36 to the printer 34. The printer 34 receives the transmitted printing instruction, and based on the received printing instruction, records an image based on image data on paper 84R, and further prepares a print 84P. Thereafter, the personal computer 36 deletes, from the memory 50, the order information and image data, for which printing processing has been completed.

In the printing system 20 of each laboratory 18, among orders received by the center server 16, the order information 62, in which the laboratory 18 is specified as one at which a customer receives a print, is transmitted thereto via the network 22 together with the image data 60, and stored in the memory 50 of the personal computer 36 in such a manner as described above. In the printing system 20, during opening hours, the order information 62 transmitted via the network during operating hours is processed in the same manner as that of the order information 62 brought in by a customer (normal operation of the printer 34), and the print 84P is prepared. The order information for which printing processing has been completed is deleted from the memory 50.

Order information 62, in which a nonstandard print size (for which a small number of prints is ordered) or special processing is specified, should be processed during operating hours, and order information 62 which is not processed during operating hours (that is, order information 62 in which standard processing or print size, for which a large number of prints is ordered, is specified) should be processed during an unattended operation (described later). Alternatively, order information 62 should be processed in order corresponding to order of reception thereof during operating hours, and unprocessed order information which cannot be processed during operating hours should be processed by an unattended operation.

When the laboratory closes, an operator returns home. At this time, the printing system 20 is changed to an unattended operation, and order information 62 which was not processed or was not able to be processed during operating hours, and order information 62 which will be transmitted via the network 22 after the closing time will be processed at the maximum until eight in the next morning (during an unattended operation).

In order that unprocessed order information which was not processed or was not able to be processed during operating hours be processed by an unattended operation, it is necessary that, during operating hours, an operator should previously input order information by operating the input operating means 40 such as a keyboard or mouse, and read image data by the scanner 30 or memory reader 32 to input, as digital data, the order information 62 and the image data 60 into the printing system 20.

The unprocessed order information 62 which was not processed or was not able to be processed during operating hours, and the image data 60 are inputted, and thereafter, an operator carries out set-paper determination processing (described later in detail) by the personal computer 36, and sets, in the printer 34, a paper 84R of the type specified as the result of this processing, and changes the printing system 20 to an unattended operation. After changing to the unattended operation, the unattended operation of the printing system 20 is controlled by unattended operation scheduling processing (described later in detail) by the personal computer 36.

Then, when an operator goes to the laboratory at eight in the next morning, the unattended operation is terminated. After the unattended operation ends, in the printing system 20, before-business-hours scheduling processing (described later in detail) is executed by the personal computer 36, and the operator changes the paper set in the printer 34 to paper specified by this processing (changes the magazine 86), and tries to complete processing order information 62 remaining in the memory 50, that is, unprocessed order information which was not able to be processed by the unattended operation, by ten in the morning (that is, the opening time). Thereafter, the operator changes the printing system 20 to a normal operation and starts business.

When unprocessed order information cannot be processed by the opening time, because, usually, a small number of customers comes to a laboratory immediately after the opening time, therefore, such unprocessed order information may be continuously processed even after the opening time.

Further, the personal computer 36 may have the function of giving instructions to an operator (corresponding to a prediction/indicating means of the present invention), for example, the function of, at the time of start of the unattended operation, predicting the amount of order information which will not be able to be processed by the unattended operation and indicating a working start time for the operator in the next morning on the display screen 42 to instruct the operator to go to a laboratory earlier in the next morning, thereby causing the operator to go to the laboratory earlier in order that all unprocessed order information can be processed by the opening time. Moreover, the personal computer 36 may also have a so-called operator call function (corresponding to a state indicating means of the present invention), for example, the function of calling an operator to go to a laboratory earlier in the next morning using an electronic mail message or the like depending on the processing state of the unattended operation (for example, interruption of printing processing due to a paper jam or out of paper). The function of indicating or calling an operator an early start of working hours as described above is easily realized by using software.

Next, set-paper determination processing, unattended operation scheduling processing and before-business-hours scheduling processing, which are each executed by the personal computer 36, will be sequentially described with reference to the flow charts shown in FIGS. 4 to 6. The set paper determination processing is performed by reading out the algorithm software program 70 shown in FIG. 2 and executing the program in the CPU 46. The unattended operation scheduling processing and the before-business-hours scheduling processing are each performed by reading out the scheduling software program 72 shown in FIG. 2 and executing the program in the CPU 46. In the following description, illustration of FIGS. 7A–7F will be given as a specific example for reference.

[Set-paper Determination Processing]

Figure 4:
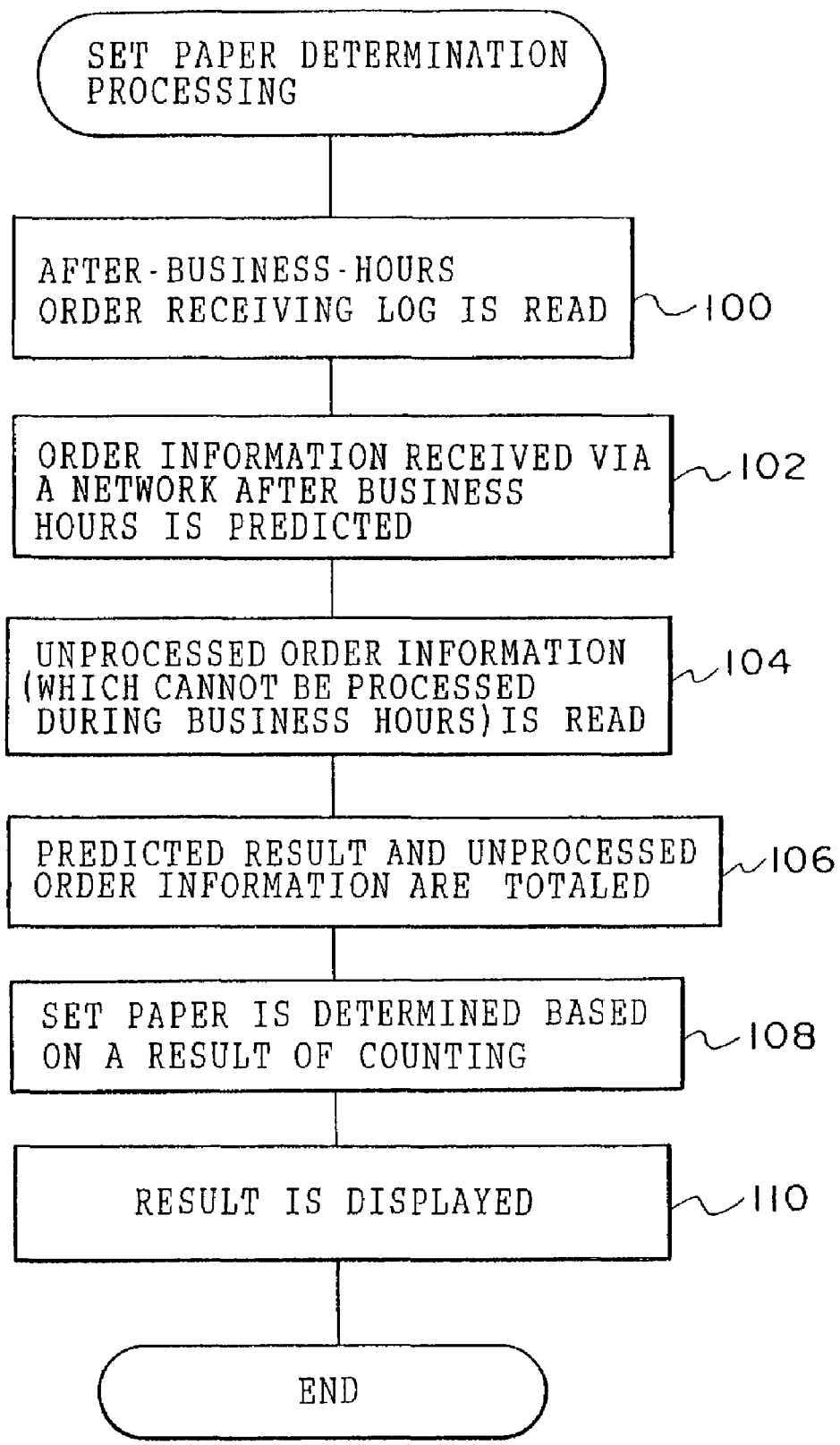
FIG. 4 is a flow chart of set paper determination processing, which is executed by a computer of the printing system according to the embodiment of the present invention.

FIG. 4 is a flow chart of the set-paper determination processing. When the set-paper determination processing is started by an operator inputting an instruction from the input operating device, as shown in FIG. 4, in step 100, an after-business-hours order receiving log 64, which shows a history of order information received in the past after the closing time, is read from the memory 50. The set-paper determination processing may be started when a predetermined time comes, without an operator inputting an instruction.

In step 102, based on the after-business-hours order receiving log 64, order information which is supposed to be transmitted via the network 22 after the closing time, that is, order information which is supposed to be received via the network 22 (print size, type of paper surfaces, type of special processing and number of orders) is predicted. The more the record of order information received in the past after the closing time is stored, the more accurate prediction of order information becomes.

The aforementioned prediction should be made in consideration of the following tendency to receive orders. For example, as the seasonal tendency, orders of prints of L size increases after a long vacation such as a summer vacation, or in the season of athletic meeting, and order of prints of post-card size increases when the demand for new year greeting cards increases at the end of the year. Further, an order of special processing also depends on the season. For example, orders of prints of quarter or sixmo increases at the season in which the demand for calendars increases, and orders of printing an absentee in a yearbook photograph increase in March every year. Such tendencies can be easily understood from the after-business-hours order receiving log 64.

Further, receipt of orders also depends on the region; in which an individual laboratory is located, irrespective of the season. For example, order information transmitted via the network 22 in the night is small in number in an area in which elderly people reside. On the other hand, such order information is large in number in a students' quarter or new residential area in which young people are resident. Such tendencies to receive orders depending on the location of a laboratory can be of course understood from the after-business-hours order receiving log 64, or can also be understood using a geographical information system (GIS) or the like.

Furthermore, when a certain special processing is advertised on television, on the radio, in a magazine or in an insert, orders of the special processing is also supposed to increase due to the advertising effect.

In the subsequent step 104, unprocessed order information 62 is read from the memory 50. In step 106, the predicted result of step 102 and the unprocessed order information 62 are totaled up. This counting operation is one in which predicted order information and unprocessed order information are added up and arranged for each size of paper to be used and for each type of paper surfaces, and thereafter, the number of prints processed for each paper size and each type of paper surfaces is counted.

In step 108, based on the result of the counting operation, the paper sizes for which the counted number of prints is the greatest and the second greatest are determined as ones of papers (set-papers) to be set in the printer 34. In the subsequent step 110, the result of the determination is displayed on the display screen 42 of the personal computer 36 and notified to the operator. Then, the set-paper determination processing ends.

In other words, in the set-paper determination processing, in order that order information is processed (printed) at the maximum during an unattended operation, a determination is made as to which magazine 86, in which paper 84R is loaded, should be mounted. Namely, the size (widthwise dimension) of the paper 84R is determined.

Due to the set-paper determination processing, in the example shown in FIGS. 7A–7F, when unprocessed order information and predicted order information are shown as described in FIG. 7A, two paper sizes shown in FIG. 7B are determined as ones of papers to be set in the printer 34.

Figure 8:
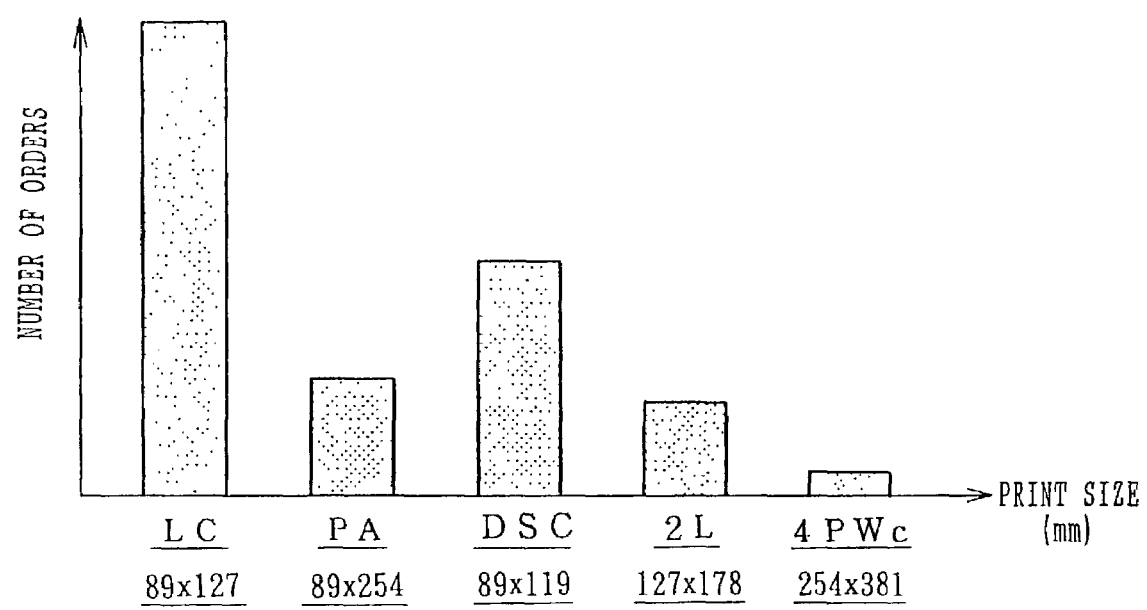
FIG. 8 is a graph showing the number of common orders for each print size.

FIG. 8 shows the number of orders for each of typical print size, and it can be seen that a large number of orders for print sizes of LC, PA and DSC, in which paper of 89 mm in width is used, is given. Generally, the paper size for which the greatest number of printing orders are given is 89 mm in width. One of two set-papers determined by the set-paper determination processing is 89 mm in width in almost cases, and the remaining set-paper depends on the season, a region in which the laboratory 18 is located, or an advertisement.

An operator confirms the result of determination of the set-paper displayed on the display screen 42. When paper 84R of a paper size shown as the result of determination is not set in the printer 34, the operator sets the paper 84R of the determined paper size in the printer 34 (magazine is changed), and thereafter, he or she inputs an instruction to start an unattended operation by operating the input operating means, and changes to the unattended operation. As a result, the personal computer 36 starts the unattended operation scheduling processing.

The unattended operation scheduling processing may be automatically carried out when the paper 84R of the determined paper size is set in the printer 34 after the set-paper determination processing, by a sensor which confirms the type of the paper 84R being set, for example, in the printer 34.

[Unattended Operation Scheduling Processing]

Figure 5A:
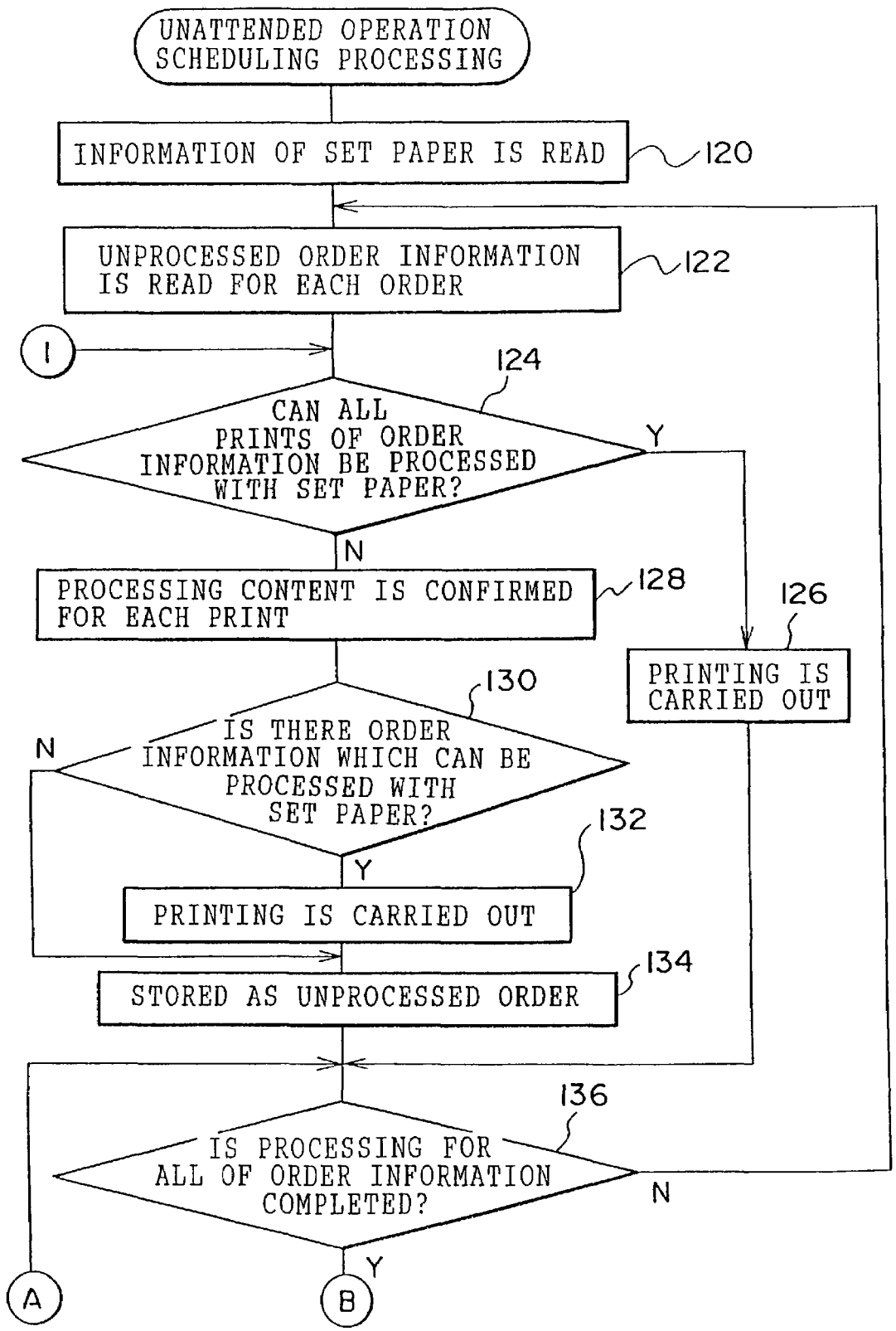
FIGS. 5A and 5B are flow charts of unattended operation scheduling processing, which is executed by a computer of the printing system according to the embodiment of the present invention.
Figure 5B:
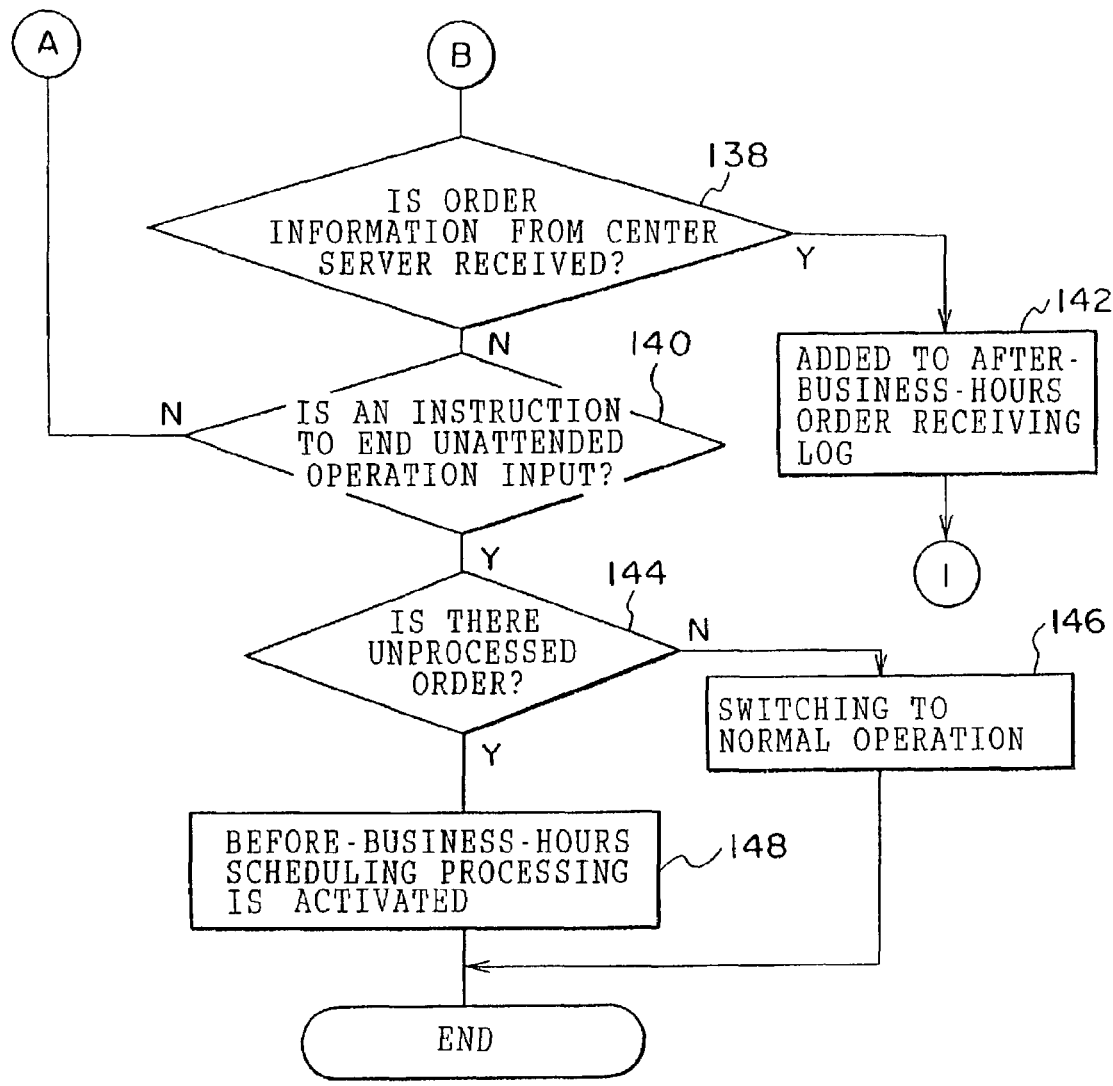

FIGS. 5A and 5B show flow charts of unattended operation scheduling processing. As shown in FIGS. 5A and 5B, in the unattended operation scheduling processing, first, in step 120, information which indicates the paper (set-paper) 84R set in the printer 34 at the present, such as information indicating the result of the set-paper determination processing, is read. Subsequently, in step 122, unprocessed order information is read from the memory 50 for each order, that is, for each customer. In step 124, it is determined whether order information of one customer can be processed by the paper 84R set in the printer 34.

When all of prints ordered by the one customer can be processed by the set-paper 84R, the process proceeds to step 126 in which a printing algorithm corresponding to the order information is selected, and a printing instruction based on order information and image data, generated in accordance with the printing algorithm, is sent to the printer 34 to allow the printer 34 to carry out printing. At this time, image data and order information transmitted to the printer 34 are deleted from the memory 50. Thereafter, the process proceeds to step 136, which will be described later.

On the other hand, when all of prints ordered by the one customer cannot be processed though can be processed by the set-paper 84R, the process proceeds to step 128 in which the processing content is confirmed for each of prints indicated by the order information. When there is a print which can be processed by the set-paper 84R, the process proceeds from step 130 to step 132, in which only prints which can be processed by the set-paper 84R are printed in the same manner as in step 126. In the subsequent step 134, prints which cannot be processed by the set-paper 84R are stored, as unprocessed order information, in the memory 50, and the process proceeds to step 136. When the processing content is confirmed for each of prints and there is no print which can be processed by the set-paper 84R, the process proceeds from step 130 to step 134, in which the order information is stored as the unprocessed order information, and the process proceeds to step 136.

In step 136, it is determined whether the aforementioned processing has been completed for all of unprocessed order information 62 stored in the memory 50. When unprocessed order information remains in the memory 50, the process returns to step 122 and the aforementioned processing is repeated. When the processing for all of unprocessed order information 62 has been completed, a waiting state is placed until new order information is received from the center server 16 (step 138) or an instruction to end an unattended operation is inputted (step 140).

When new order information is received from the center server 16 via the network 22, the process proceeds from step 138 to step 142 in which the received information is stored, as unprocessed order information 62, in the memory 50 and added to the after-business-hours order receiving log 64 (because it is received after the closing time). Thereafter, the process returns to step 124 and the aforementioned processing is carried out.

During the unattended operation, a printing plan is set so that order information, which can be subjected to printing processing by the paper 84R set in the printer during the unattended operation (shown in FIG. 7B), may be printed in the order shown in FIG. 7C, among unprocessed order information (order information of customers A to G) shown in FIG. 7A in the example shown in FIGS. 7A–7F, and printing is carried out in accordance with the printing plan. Further, order information, which cannot be processed by the set-paper during the unattended operation (see FIG. 7E), is stored in the memory 50 as unprocessed order information.

As a result, during the unattended operation, unprocessed order information 62 is processed (printed) in such a manner that order of processing for unprocessed order information be changed (arranged) so that order information which can be processed by the printer 34 may be sequentially processed irrespective of order of reception thereof. Therefore, printing processing can be carried out without requiring a change of paper (that is, the magazine 86).

In this case, the printer 34 generally outputs prepared prints 84P while sorting them for each customer by using a sorting function (not shown). A typical printer has a sorting function of 25 stages or thereabouts. Accordingly, during an unattended operation, order information from more than 25 customers cannot be processed. Further, in order to process order information during the unattended operation at the maximum, when the predetermined maximum number of prints is outputted into respective stages without being sorted for each customer, a sorting operation by an operator for each customer becomes complicated.

In order to solve the aforementioned drawbacks, in the printing system according to the present embodiment, as shown in FIG. 9, an order-sheet issuing/output device 204 is disposed above an exhaust tray 200 to issue an order sheet 202, on which a customer's name or the like is described, and discharge the issued order sheet 202 toward the exhaust tray 200. The order-sheet issuing/output device 204 is connected to the personal computer 36 and is controlled by the personal computer 36 so as to issue an order sheet of a corresponding customer between prints 84P outputted from the printer 34 for the corresponding customer and prints 84P outputted from the printer for another customer. Further, during the unattended operation, as the exhaust tray 200, a large-number receivable tray (or a one-stage sorter) on which a large number of prints 84P can be placed is used.

In other words, in the printing system 20, during the unattended operation, the order sheet 202 with a customer's name or the like described thereon is inserted between prints 84P outputted for each customer and prints 84P based on order information of a plurality of customers are outputted into the large-number receivable tray (or the one-stage sorter). Since the order sheet 202 is inserted between the prints 84P outputted for each customer, even if the prints 84P based on order information of a plurality of customers are placed in an overlapping state on the exhaust tray 200 by the unattended operation when an operator goes to a laboratory in the next morning, the prints 84P can be easily sorted for each customer. Therefore, a burden on the operator for sorting operation can be reduced.

The order sheet 202 may be preferably formed so as to have a color or size different from the prints 84P or placed so that a position to which it is discharged onto the exhaust tray 200 is displaced (slightly) from the position of the prints 84P. Since the color or size of the order sheet 202, or the position to which the order sheet is discharged is thus varied, even if the print 84P and the order sheet 200 are made overlapping on the exhaust tray 200, they can be readily distinguished from each other, thereby allowing an operator's burden of a sorting operation to be further lessened.

In place of the order sheet 202, a simple partition sheet may be inserted between prints 84P outputted for each customer. However, when the order sheet 202 is used as in the present embodiment, the following effects can also be expected.

Next, a description will be given of a case in which the order sheet 202 shown in FIG. 10 is inserted between prints for each customer. In FIG. 10, printed on the order sheet 202 is order data such as a customer number for identification of a customer, a file name of image data for which printing is ordered, designation of white border or no border, print size and number of prints. When there is order information for which printing cannot be processed during the unattended operation, "unprocessed" (indicated by arrow A in FIG. 10) is printed therefor, as information indicating unprocessed order information, in place of the number of prints.

In other words, if an operator confirms the order sheet 202 during the sorting operation and finds order sheet for which "unprocessed" is printed, he or she can simply recognize that there is unprocessed order information (for which printing has not been completed) and proceed with a next necessary operation. The aforementioned order sheet can be easily issued by, for example, managing image data for which printing is ordered, based on Exif standard.

When an instruction to end an unattended operation is inputted to the personal computer 36 by an operator, going to a laboratory in the next morning, operating the input operating means 40, the process proceeds from step 140 to step 144 and it is determined whether order information which cannot be processed during the unattended operation remains. If no unprocessed order information remains, the process proceeds to step 146 in which a normal operation is set and the unattended operation scheduling processing ends.

When unprocessed order information remains, the process proceeds to step 148 in which before-business-hours scheduling processing is activated, and the unattended operation scheduling processing is terminated.

[Before-business-hours Scheduling Processing]

FIG. 6 shows a flow chart of before-business-hours scheduling processing. In the before-business-hours scheduling processing shown in FIG. 6, in step 150, unprocessed order information is sorted for each paper size and each type of paper surfaces. In the subsequent step 152, based on the sorting result, the order of processing for each paper size is determined on the basis of the ordered number of respective paper sizes (namely, the paper size, for which the largest number of prints is ordered, is processed first). The paper sizes, in which the largest and second largest numbers of prints are ordered, are determined as ones of papers to be subsequently set in the printer 34. In step 154, a message, which indicates a change of paper (that is, the magazine 86) in the printer 34, is displayed on the display screen 42 of the personal computer 36, thereby giving an operator an instruction to change paper (the magazine 86) in the printer 34.

When paper (magazine 86) is changed based on the instruction, the process proceeds from step 156 to step 158 and unprocessed order information which can be processed (printed) using paper 84R (set-paper) set in the printer 34 after changing paper is processed (printed). In the subsequent step 160, it is determined whether all of order information which can be processed using the paper 84R (set-paper) set after changing paper has been printed. If the decision of step 160 is negative, the process returns to step 158 and printing is repeatedly carried out until all of order information which can be processed using the changed paper has been printed.

When all of order information which can be printed using the changed paper 84R has been printed, the process proceeds from step 160 to step 162. If unprocessed order information remains, the process returns to step 154 in which an instruction to change papers (magazines 86) is displayed such that the paper sizes, in which the largest and second largest numbers of prints are ordered, are determined as ones of papers to be subsequently set in the printer 34, among remaining (unprocessed) sizes of papers on the basis of the order of processing for each paper size determined in the aforementioned step 152, and the similar operation to the aforementioned one is repeated.

Accordingly, in the before-business-hours scheduling processing, an instruction to change paper (magazine 86) in the printer 34 is given in the paper size shown in FIG. 7D, and printing is carried out in the order indicated by FIG. 7E.

In other words, unprocessed order information is arranged for each paper size, and the order of printing processing is changed so that the processing is sequentially performed for each paper size. As a result, the number of times in which paper (magazine 86) of the printer is changed by an operator can be kept to a minimum and operating efficiency can be improved.

When the aforementioned processing for all of unprocessed order information has been completed, a normal operation is set and the before-business-hours scheduling processing ends. An operator arranges prints (that is, prints which were not able to be processed on the previous day and prints ordered after the closing time of the previous day) prepared by the printer 34 for each customer, and makes preparation for delivery the same to each customer after the opening time.

As described above, in the present embodiment, during the unattended operation, the order of processing unprocessed order information 62 is changed to be rearranged by the unattended operation scheduling processing so as to be processed without changing the paper 84R (that is, the magazine 86), and order information which can be processed using the paper 84R set in the printer 34 is printed preferentially. As a result, unprocessed order information can be processed in an unmanned state at the maximum.

Before switching to the unattended operation, the size of paper by which the greatest number of prints are to be printed is selected by the set-paper determination processing and the selected result is notified to an operator. Therefore, so long as the determined paper 84R is set in the printer 34 during the unattended operation, order information can be processed by the unattended operation at the maximum.

In the set-paper determination processing, the after-business-hours order receiving log 64, that is, the history of order information, which has been received after the closing time in the past, is held, and order information which is supposed to be transmitted via the network after the closing time of that day is predicted from this history. Based on the predicted result and unprocessed order information which was not processed or cannot be processed during operating hours, the type of paper 84R to be set in the printer 34 is selected. Accordingly, order information received via the network 22 after the closing time can also be efficiently processed.

As a result, the operation rate of the printing system 20 during the unattended operation can be increased, and order information which must be processed by an operator on the following day is decreased, thereby lessening an operator's burden. To that end, it suffices that the algorithm software program 70 and scheduling software program 72 may be executed by the CPU 46 as described above, that is, it suffices that only software may be modified or added. Therefore, this can be easily realized at a low cost.

Further, even if an order can be received via the network after the closing time, the type of paper 84R set during an unattended operation is determined in consideration of the number of orders received via the network after the closing time. Therefore, an operator's burden is lessened and prints can be delivered to a customer on the following day. That is, a printing service can be provided in which prints ordered by a customer via the network 22 in the night can be delivered to the customer on the following day. If such printing service is widely recognized, it can be anticipated that customers hoping to print based on digital data will crowd into the laboratory 18 of the network printing system 10. Further, when franchising laboratories 18, or creating chain store of laboratories 18, the number of shops affiliated with chain stores or franchise stores can also be expected to increase.

Generally, many orders of picture prints are placed for paper sizes of 89 mm in width, such as LC, PA and HV sizes. The second largest number of orders of picture prints placed for paper size of 127 mm in width makes up only a several percentage of the total number of orders.

When the printer 34 in which two magazines 86 can be loaded is used, usually, the two magazines 86 each accommodate paper of 89 mm in width based on the aforementioned ratio of the number of orders. When an order of prints using a paper size of 127 mm in width is received, it is considered that the magazine 86 is changed by an operator. However, to change the magazine in each case of such order imposes a large burden on an operator. Further, orders of prints using a paper size of 127 mm in width cannot be processed in the night or on a holiday, and this unprocessed order information must be processed after an operator goes to work on the following day. Therefore, it is highly possible that such order information can be processed by the opening time.

Alternatively, it is also considered that paper of 89 mm in width is assigned to one of the two magazines 86 loaded in the printer 34 and papers of 127 mm in width are assigned to the other magazine. However, there is a risk that only one magazine 86 in which paper of 89 mm in width is accommodated may not be sufficient for all of orders given for prints using this paper size during an unattended operation in the night or on a holiday. Moreover, it is still further considered that the number of the magazines 86 loaded in the printer may be increased, for example, two magazines in which papers of 89 mm in width are accommodated, and one magazine in which paper of 127 mm in width is accommodated, are provided. In this case, the size of the printer 34 becomes larger correspondingly to the increase in number of magazines, which is not preferable from the standpoint of costs.

Figure 11:
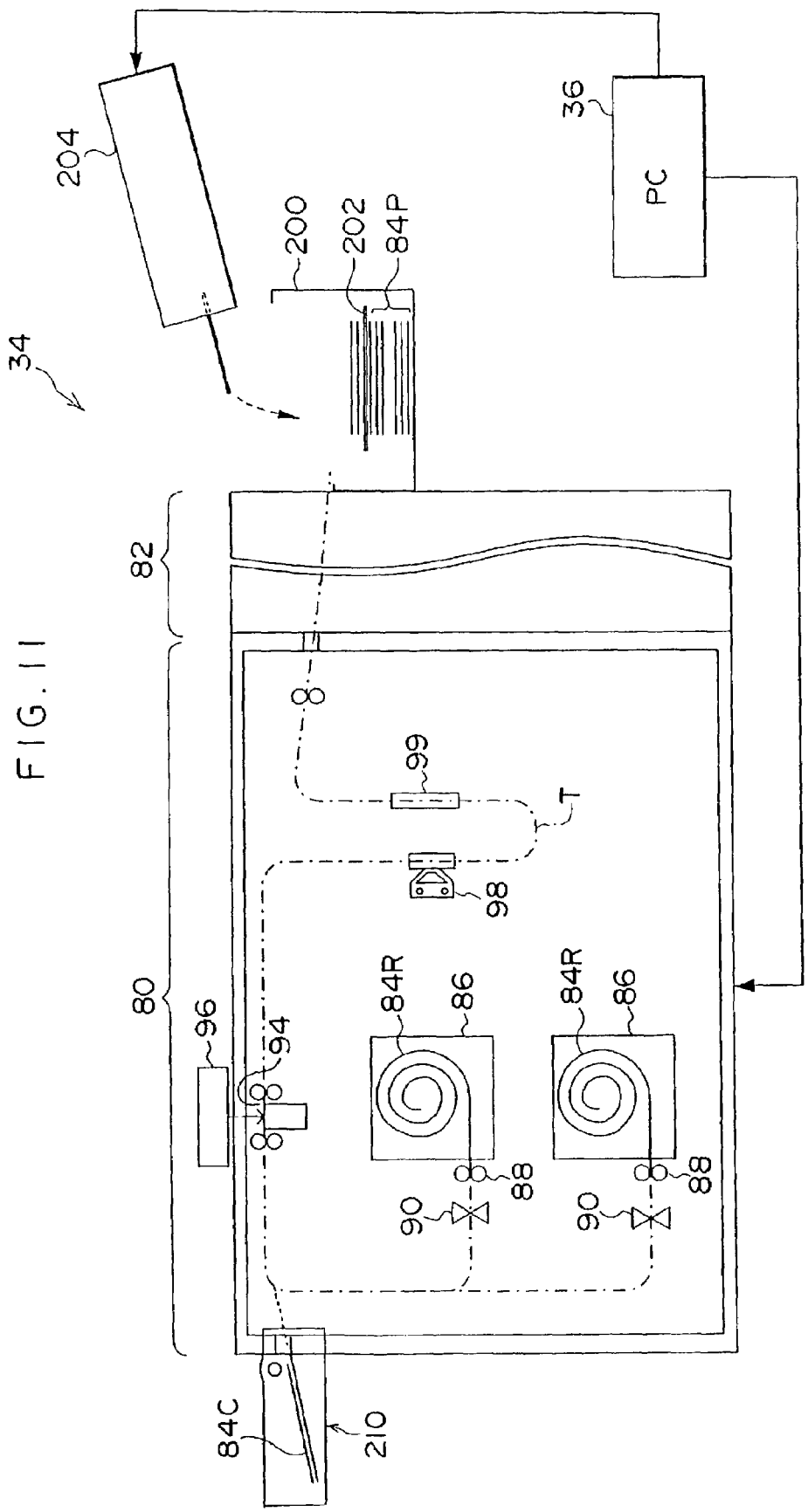
FIG. 11 is a block diagram which schematically shows the structure of a printer according to another embodiment of the present invention.

Accordingly, as shown in FIG. 11, in addition to the magazines 86 mounted within the printer 34 (specifically, the exposing device 80) and serving as a main supplying (feeding) means, a light-shielding cut paper tray 210, in which paper (cut paper) 84C cut into a predetermined size can be accommodated and which pulls out the accommodated papers 84C one by one and guides it to an interior of the printer 34 (specifically, guides it to the exposing device 80), is further provided, as a sub-supplying (feeding) means, in the printer 34. Preferably, printing processing is carried out by selecting paper (roll paper) 84R accommodated in the magazine 86, or paper (cut paper) 84C accommodated in the cut paper tray 210 in accordance with order information. The cut paper tray 210 may have papers 84C of plural sizes set therein at the same time.

In FIG. 11, there is described a case in which paper 84C guided from the cut paper tray 210 into the exposing device 80 runs on a conveying path of paper 84R pulled out from the magazine 86 by conveying rollers 92 or the like from a position immediately before the exposure section 94. However, conveying paths of paper 84C and 84R may be made to join together in the exposing device 80. It should be understood that the paper 84C after led in the conveying path may be processed in the same manner as the paper 84R.

Since the cut paper tray 210 is thus provided, the cut paper tray 210 can be used for the paper size for which prints of a small number of orders are to be prepared, and the magazine 86 can be used for the paper size for which prints of a large number of orders are to be prepared. Accordingly, the number of orders which can be processed during the unattended operation increases and a processing load on an operator before the opening time can be reduced. Further, an order of prints of a special size (for example, one sheet of A4 size) can be processed without changing the magazine 86 during the operating hours. Moreover, the outside dimension of the printer 34 can be made smaller compared to that of the printer 34 in which the number of magazines 86 is increased.

When the cut paper tray 210 is provided, it should be understood that, in the personal computer 36, an operator may be notified in such a manner that which size (width dimension) of paper 84R is to be accommodated in the magazine 86 to be loaded in the printer, and which size and number of sheets of paper 84C is to be accommodated in the cut tray paper 210, are displayed on the display screen 42 in the aforementioned set-paper determination processing (see FIG. 4) and before-business-hours scheduling processing (see FIG. 6).

In the foregoing, there was described a case in which the printing system 20 is operated in an unmanned manner from the closing time until an operator goes to work on the following morning. However, even on a holiday, namely, when an operator cannot receive an order from a customer visiting the laboratory 18, the printing system 20 may be similarly operated in an unmanned manner. In this case as well, it is possible to receive and process order information given via the network. Therefore, the printing system 20 can be operated even on a holiday and the operation rate thereof can be improved.

Further, there was described above a case in which each printing plan of the printing system 20 is set by the personal computer 36 of respective laboratories 18 and scheduling processing for printing in accordance with the printing plan is carried out. However, the present invention is not limited to the same, and scheduling of the printing system 20 of each laboratory 18 may be managed in the center server 16. In this case, the printing system of the present invention is formed by the center server 16 and the printing system 20.

For example, when the print size or special processing which can be processed in the printing system 20 varies in each laboratory 18, an algorithm indicating processing for selecting a laboratory 18 in which a printing system 20 suitable for processing order information is installed, and for transmitting order information to the selected laboratory 18, is provided as a printing algorithm at the side of the center server 16, and order information is collectively all received by the center server 16. In the center server 16, the printing algorithm corresponding to each order information is selected, and based on the selected printing algorithm, a laboratory 18 in which an appropriate printing system 20 is installed to process each order information is selected, and the order information may be transmitted to the selected laboratory 18.

Further, when there are a plurality of laboratories 18 each having an appropriate printing system 20 installed therein, a most suitable laboratory 18, for example, a laboratory 18 which allows most rapid processing based on unprocessed order information of each laboratory 18 is selected and order information may be transmitted to the selected laboratory 18.

As described above, in the present invention, printing processing can be efficiently carried out at a low cost.

What is claimed is:

1. A printing system comprising:
  a reception section for receiving order information which indicates an order of printing processing in which an image is printed on a recording medium; and
  a control section which controls so as to select a predetermined printing algorithm corresponding to the received order information, determine a printing plan of the order information for printing the image on a recording medium set as the recording medium to be printed, and print the image in accordance with the determined printing plan,
  wherein the control section determines the recording medium by which a maximum amount of the order information can be processed during control by the control section.

2. The printing system of claim 1, wherein the control section predicts the order information to be received by the reception section, and based on a predicted result of the order information to be received and the order information already received, predicts the recording medium by which the maximum amount of the order information can be processed during control by the control section, and determines the printing plan for printing the image on the predicted recording medium.

3. The printing system of claim 2, wherein the control section predicts, based on history information of the order information received in the past, the order information to be received.

4. The printing system of claim 1, further comprising a state notifying section which gives notification of a state controlled by the control section.

5. The printing system of claim 1, further comprising a prediction/notifying section which predicts and gives notification of an amount of order information which cannot be processed by control of the control section.

6. The printing system of claim 1, wherein the reception section includes an input section for directly inputting the order information.

7. The printing system of claim 1, wherein the reception section includes a receiving device which is connected to a network and receives order data transmitted from a device connected to the network, the received order data being received as the order information.

8. The printing system of claim 1, wherein the recording medium can be supplied selectively from a main supplying section mounted within the printing system and a sub-supplying section provided so as to be capable of changing the recording medium supplied from outside of the printing system, and the control section determines the printing plan for each of the recording medium supplied from the main supplying section and the recording medium supplied from the sub-supplying section.

9. The printing system of claim 8, wherein the main supplying section supplies an elongated recording medium which is cut at a time of printing, and the sub-supplying section supplies a recording medium previously cut into a predetermined size.

10. The printing system according to claim 1, wherein said printing algorithm comprises processing to prepare one of a print of a specified print size and a print based on a special processing.

11. The printing system according to claim 10, wherein the special processing comprises one of enlargement of image data corresponding to a print size, reduction of image data corresponding to a print size and insertion of image data in a predetermined template.

12. The printing system according to claim 7, wherein said network comprises an Internet.

13. The printing system according to claim 1, wherein said order information comprises a sequential order in which images according to the order information are printed on the recording medium.

14. The printing system according to claim 2, wherein the prediction on the order information is based on one of a season of a year, an age group of users in a vicinity of the printing system, and a printing promotion.

15. The printing system according to claim 1, wherein said printing plan is set during an unattended operation of the printing system.

16. The printing system according to claim 2, wherein the control section further predicts a recording medium by which a second greatest amount of order information can be processed.

17. A printing system comprising:

a reception section for receiving order information which indicates an order of printing processing in which an image is printed on a recording medium; and a control section which controls so as to determine a printing plan for printing an image preferentially on a recording medium set in advance, among the received order information, and prints the image in accordance with the determined printing plan, wherein the control section determines the recording medium by which a maximum amount of the order information can be processed during control by the control section.

18. The printing system according to claim 17, wherein the control section determines order of printing, irrespective of acceptance order of the received order information accepted by the reception section, such that printing the image on the recording medium set in advance is carried out in preference to printing the image on current recording medium.

* * * * *